United States Patent [19]

Difeo

[11] Patent Number: 5,785,480
[45] Date of Patent: Jul. 28, 1998

[54] ADJUSTABLE NUT

[76] Inventor: Mark J. Difeo, P.O. Box 2, East Hamstead, N.H. 03826

[21] Appl. No.: 404,999

[22] Filed: Mar. 16, 1995

[51] Int. Cl.$^6$ ................................................. F16B 37/08
[52] U.S. Cl. .................................. 411/433; 411/436
[58] Field of Search .............................. 411/432, 433, 411/437, 393, 436

[56] References Cited

U.S. PATENT DOCUMENTS

| | | | |
|---|---|---|---|
| 422,361 | 3/1890 | Alton . | |
| 1,065,866 | 6/1913 | Fraley | 411/393 |
| 1,861,506 | 6/1932 | Nelson | 411/393 |
| 1,862,623 | 6/1932 | Harrington | 411/393 |
| 3,017,657 | 6/1962 | Mills | 411/393 |
| 3,058,211 | 10/1962 | Axtell | 411/393 |
| 3,197,894 | 8/1965 | Ratkowski | 411/393 |
| 4,693,656 | 9/1987 | Guthrie | 411/433 |
| 4,828,221 | 5/1989 | Scobie | 411/393 |
| 4,934,889 | 6/1990 | Kurosaki | 411/433 |
| 5,098,242 | 3/1992 | Schaty | 411/437 |
| 5,397,206 | 3/1995 | Sihon | 411/544 |

*Primary Examiner*—Steven N. Meyers
*Assistant Examiner*—Gary Estremsky
*Attorney, Agent, or Firm*—Christopher P. Ricci

[57] ABSTRACT

An adjustable nut is disclosed which has a body with an axial passageway therethrough for receiving a threaded shaft and a transverse bore communicating with the axial bore. A button is disposed in the transverse bore which has an elongate aperture passing radially therethrough. The elongate aperture intersects with the axial passageway such that said threaded shaft can pass through the elongate aperture. The button is urged out of the transverse bore by the biasing means but is secured within the transverse bore by the restrictive means to form an operative position and an inoperative position. The operative position mechanically interconnects mating threads on a distal end of the elongate aperture with threads on the threaded shaft. The adjustable nut can then be rotated to loosen or tighten the adjustable nut. The inoperative position is assumed when the button is depressed which moves the mating threads in the elongate aperture away from the threads on said threaded shaft. In doing so, substantially all mechanical restriction to motion with respect to the bolt have been removed and the adjustable nut can be slid off the threaded shaft quickly and easily.

4 Claims, 5 Drawing Sheets

ADJUSTABLE NUT

BACKGROUND OF THE INVENTION

The present invention relates generally to fastening devices, and, more particularly, the invention relates to adjustable nuts for use on threaded shafts such as those found on drum sets having cymbals.

A drum set is a group of separate percussion instruments which often includes one or more cymbals. The drum set is usually played in concert with other instruments to perform a musical composition. In doing so, the musical instruments must be moved to performance centers or rehearsal halls such that the musical composition can be performed for an audience or the group of instrumentalists can rehearse, respectively. To move a drum set requires a tedious task of breaking down the drum set. For example, a cymbal is generally held on a cymbal stand by placing the cymbal over a threaded shaft, placing a felt washer over the cymbal, and threading a hex nut on the threaded shaft to hold the cymbal in place. This operation is then repeated for each cymbal.

With particular regard to the cymbal set, the aforementioned hex nut is tightened down over the felt washer to ensure that vibrations of the cymbals are not restricted by the nut. A problem with this is that the felt is a loose material which can become caught in the threads of the nut making loosening and tightening the nut increasingly more difficult.

Another problem encountered in breaking down and reassembling drum sets is an amount of time the setting up and breaking down the drum set consumes. When performing before audiences, there are often two or more consecutive musical bands who perform in sequence. After a first band plays, the drum set must be disassembled and removed from the stage in order that the second band can then set up their drum set and begin playing. This is time consuming and interrupts a rhythm of the concert.

A prior art nut described in U.S. Pat. No. 4,693,656 entitled "Adjustable nut" issued Sep. 15, 1987, depicts a nut for use with milling machines. The nut, as depicted, brings with it many shortcomings which make it unacceptable for use with the drum set as described. First, the prior art nut has a sleeve that extends outward to prevent wobbling of the nut during rotation. If used with the drum set, or particularly with cymbals, the sleeve would interfere with the ability of the cymbal to resonate properly.

The nut also lacks any restrictive elements for maintaining the nut as a single unit once removed from threaded shaft. The prior art nut is designed for internal use in a milling machine and would break into its component parts if removed from the threaded shaft making the prior art nut unacceptable for use in a drum set.

The prior art nut also lacks a setting mechanism for securing the nut in one position. If used with a device which is subjected to a high degree of vibration, rotational motion of the nut is almost inevitable. A drum set by definition has a high degree of vibration which would make the prior art nut loosen as the drum set is played.

Finally, the prior art nut lacks any structure enabling the nut to be tightened beyond hand-tight. It is often necessary for a nut to be threaded on by hand until hand-tight but then tightened further with a turn of a wrench. If such additional tightening is required, the prior art nut would be too loose as there is no easy way to tighten the nut with a wrench.

Accordingly, it is an object of this invention to provide an adjustable nut which can be placed on a threaded shaft, and subsequently removed, easily and rapidly.

It is another object of this invention to provide an adjustable nut which does not require additional tools unless further tightening or setting is desired in which case a port for such tools is provided.

It is still another object of the invention to provide an adjustable nut which does not come apart upon removal from a threaded shaft.

It is a further object of the invention to provide an adjustable nut which requires little rotation such that adjacent soft materials do not get caught in the threads of the nut.

These and other objects of the invention will be obvious and will appear hereinafter.

SUMMARY

The aforementioned and other objects are achieved by the invention which provides an adjustable nut for use on a bolt having a threaded shaft. The system comprises a body, a button, a biasing means and a restrictive means.

The body has a top surface, a bottom surface and a lateral surface integral with the top and bottom surfaces. An axial passageway is bored axially through the top and bottom surfaces. The axial passageway has a diameter slightly greater than that of the threaded shaft such that the threaded shaft passes through the axial passageway. The body further has a transverse bore extending radially from the lateral surface into the body such that the transverse bore intersects with the axial passageway;

A button is disposed in the transverse bore which has an elongate aperture passing radially therethrough. The elongate aperture intersects with the axial passageway and is arranged such that the threaded shaft can pass through the elongate aperture.

The button is urged out of the transverse bore by the biasing means but is secured within the transverse bore by the restrictive means. The restrictive means extends radially outward from the button into an elongate opening in the body allowing the restrictive means to move radially with respect to the body over a defined range of motion thereby defining a range of motion of the button. The restrictive means also acts to hold the adjustable nut together as a single unit upon removal of the adjustable nut from the threaded shaft.

The button then has an operative position and an inoperative position. The operative position mechanically interconnects mating threads on a distal end of the elongate aperture with threads on the threaded shaft. The adjustable nut can then be rotated for fine adjustments to loosen or tighten the adjustable nut.

The inoperative position is assumed when the button is depressed which moves the mating threads in the elongate aperture away from the threads on the threaded shaft. In doing so, substantially all mechanical restriction to motion with respect to the bolt have been removed and the adjustable nut can be moved along the threaded shaft or slid off the threaded shaft quickly and easily.

When in the operative position, the adjustable nut can be secured in a fixed position by turning a set screw. The set screw drives the button unto the threaded shaft causing a dramatically increased frictional relationship which inhibits further rotation of the adjustable nut. The set screw can also be used to simply restrain a user from removing the adjustable nut since the button cannot be depressed while the set screw is in place.

The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of fastening devices and may be embodied in several different forms, it is advantageously employed in connection with a drum set and, particularly, with a cymbal stand. Though this is the form of the preferred embodiment and will be described as such, this embodiment should be considered illustrative and not restrictive.

Figure 1:
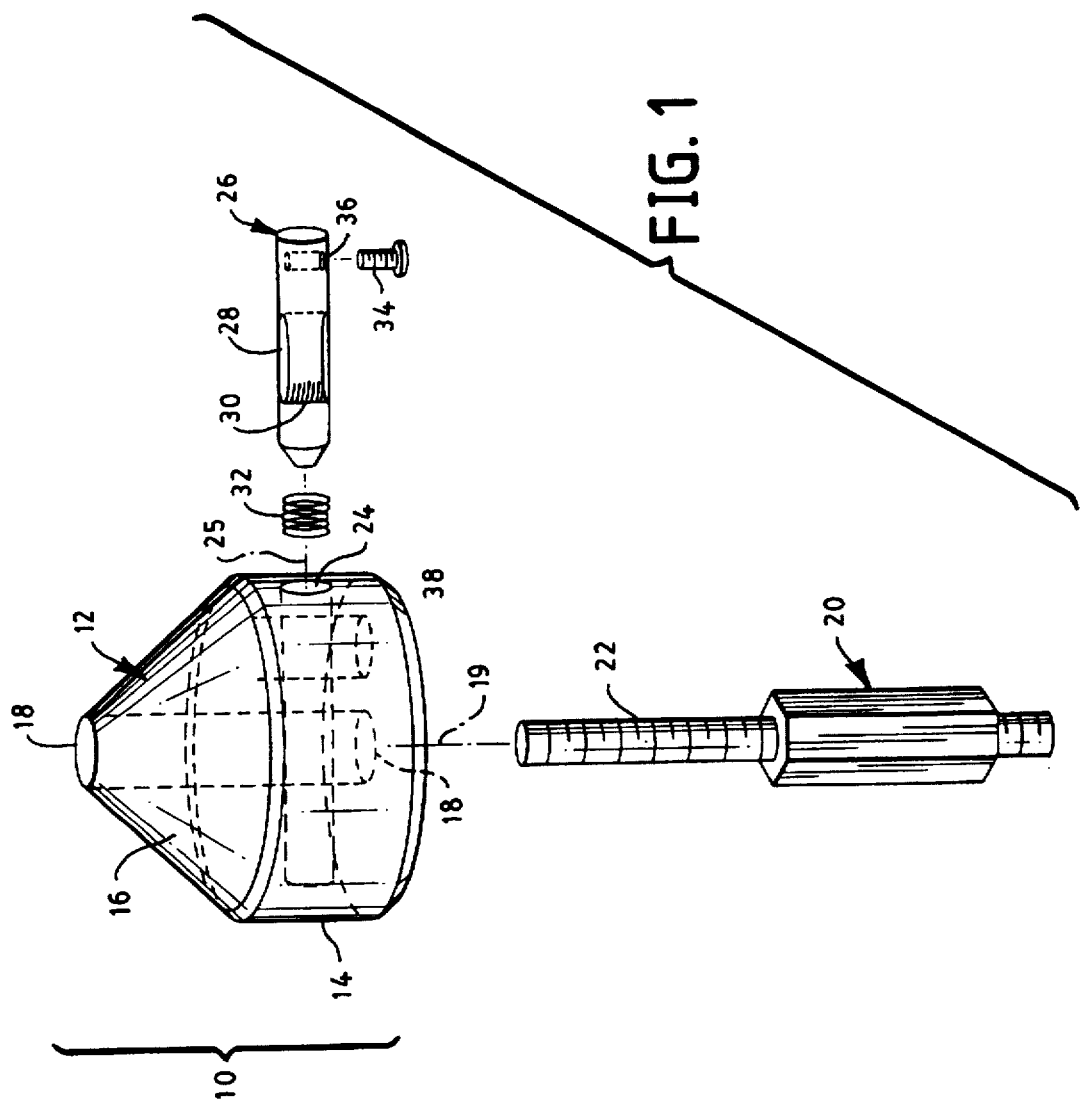
FIG. 1 shows an exploded perspective view of an adjustable nut in accordance with the invention.

FIG. 1 illustrates an adjustable nut 10 of the invention disposed above a bolt 20 having a threaded shaft 22. The adjustable nut 10 has a body 12 which, in the preferred embodiment, has a bottom section 14 which is substantially cylindrical and a top section 16 which is a conic frustum. One skilled in the art will realize that various other shapes can be substituted for the above-described top and bottom sections without detriment to the invention.

The bottom section 14 is cylindrical to provide ease of grip by hand in that the adjustable nut 10 can be rotated without a need for additional tools, the lateral surface of the bottom section 14 is dimpled for additional grip. Such a frictional surface improves a user's ability to hand tighten the adjustable nut when required.

The body 12 has an axial passageway 18 which passes through the body 12 along a central axis 19 to receive the threaded shaft 22 of the bolt 20. The top section 16 is frustro-conical to elongate the axial passageway. In this way the top section 16 provides a rigid extension above the bottom section 14 which protects against oblique forces binding the adjustable nut 10 during rotation.

The bottom section 14 has a transverse bore 24 which intersects the axial passageway 18 such that a transverse axis 25 of the transverse bore 24 intersects with and is substantially perpendicular to the central axis 19.

An elongate button 26 is formed to have dimensions slightly less than that of the transverse bore 24. In the preferred embodiment, the transverse bore 24 is a circular bore having a radius just greater than the button 26 which is cylindrical allowing the button 26 to travel therein.

The button 26 is fabricated of a hardened material such as hardened steel to avoid wear due to thread misalignment. The button 26 in the preferred embodiment is then oxidized to inhibit rusting and corrosion due, for example, to fluids in a person's skin who depresses the button 26.

The button 26 has an elongate aperture 28 passing radially therethrough which is substantially elliptical in shape for receiving the threaded shaft. A distal end of the elongate aperture 28 has threads 30 has which are fabricated to mechanically interconnect with the threads of the threaded shaft 22 on the bolt 20 thus mating the adjustable nut 10 and the bolt 20.

Before placing the button 26 into the transverse bore 24, a resilient compressive device 32 is first inserted to bias the threads 30 of the button 26 into the axial passageway 18. In the preferred embodiment, the resilient compressive device 32 is a spring through rubber or other resilient compressive materials having a high spring constant can be substituted. The high spring constant must be maintained to avoid vibration of the nut 10 causing the nut 10 to rotate.

With the resilient compressive device 32 inserted into the transverse bore 24, the button 26 is then inserted. The resilient compressive device 32 urges the button 26 outward toward an exterior of the body 12 thus biasing the threads 30 in the elongate aperture 28 into the axial passageway 18.

To keep the button 26 from coming out of the transverse bore 24, a pin 34 is screwed though an elongate opening 38 in the body 12 into a pin hole 36. The elongate opening 38 is bored such that the elongate opening 38 is substantially parallel to the transverse bore 24.

In the preferred embodiment, the pin 34 is a threaded pan-head screw driven into the pin hole 36 which is likewise threaded. One skilled in the art will realize that an unthreaded pin rammed through the pin hole 36, a magnetic pin, or other fixedly connecting device could also be used without detriment to the invention.

The elongate opening 38 is has a length sufficient to allow the pin 34 to travel within the elongate opening 38 a distance adequate for motion of the button 26 to disengage the threads 30 from the threaded shaft. In the preferred embodiment, the distance of the motion allowed by the elongate opening 38 is approximately equal to a distance between a lateral surface of the threaded shaft when disposed in the axial passageway and a lateral surface opposed to the threads of the elongate aperture when the button 26 is in the operative position.

When the button 26 is depressed with a force sufficient to overcome the outward bias of the resilient compressive device 32, the button 26 with the pin 34 extending therefrom travels inward parallel to the transverse axis 25 toward the central axis 19 until the pin 34 contacts the elongate opening 38. Concurrently, the threads 30 are moved outward away from the axial passageway 18.

Figure 2:
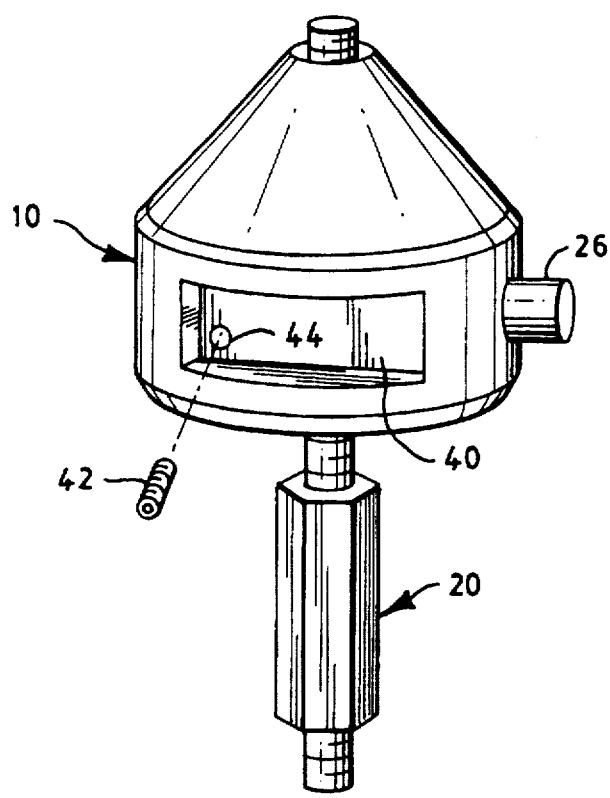
FIG. 2 shows a prospective view of the adjustable nut according the FIG. 1 in combination with a threaded shaft.

When the threaded shaft 22 is inserted into the axial passageway 18, as shown in FIG. 2, the button 26 is depressed to move the threads out of the an axial passageway 18 allowing freedom of movement of the threaded shaft 22 through the shaft aperture with minimal resistance. This is achieved because the elongate aperture 28 is elliptical and smooth on all lateral surfaces of the aperture 28 with the exception of the distal end which contains the threads 30. This allows a user to place the adjustable nut roughly in position. This gross adjustment of the adjustable nut is performed quickly without requiring rotation of the nut.

Upon releasing the button 26, the bias of the resilient compressive device 32 drives the button 26 outward forcing the threads 30 to mate with the threaded shaft 22. The adjustable nut 10 can now be rotated for fine adjustment.

Such an adjustment can take the form of tightening to a desired torque, for example.

Figure 3:
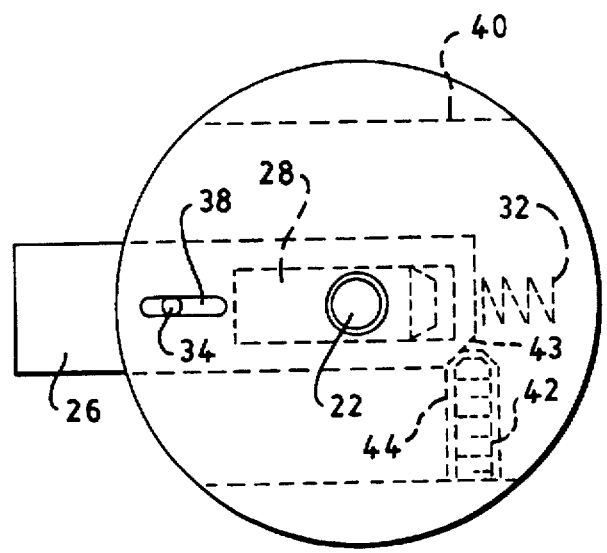
FIG. 3 shows a top cross-sectional view of the adjustable nut according to FIG. 1.

To secure the adjustable nut 10 such that further rotational motion is inhibited, a set screw 42 is anchored into a set screw hole 44 as depicted in FIG. 3. The set screw 42 is tapered at an end contacting the distal end of the button 26 which is also tapered. As the set screw is driven inward toward to transverse axis 25, the tapered end of the set screw 42 rides along the tapered end of the button 26 thus driving the button outward and, therefore, locking the threads 30 in a set position with respect to the threaded shaft 22 of the bolt 20.

The set screw 42 can also be used to when not tighten completely to inhibit depression of the button 26. If a user does not want the adjustable nut 10 to be removed from the threaded shaft 22, the set screw 42 can be rotated to an amount sufficient to impede depression of the adjustable nut 10 without restricting rotational motion for fine adjustment.

Figure 4:
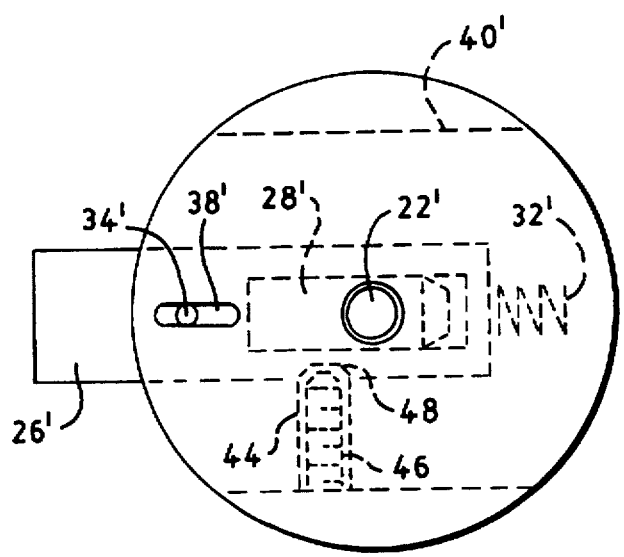
FIG. 4 shows a top cross-sectional view of the adjustable nut according to FIG. 1.

A second embodiment of adjustable nut 10' is depicted in FIG. 4 where like structures are marked with like numbers. In this embodiment, the set screw hole 44' is disposed away from the distal end of the button 26'. The set screw 42' is then driven into the set screw hole 44' such that the tapered end of the set screw 42' goes into a groove 48 on the button 26'.

The groove 48 on the button 26' has beveled edges which ride along the tapered end of the set screw 42 which secures the threads 30' with respect to the threaded shaft 22'. As the set screw is further tightened, the set screw 42 rides along the beveled edge of the groove 48 thus driving the threads 30 of the elongate aperture 28 into the threaded shaft 22 thus locking the adjustable nut 10 with respect to the threaded shaft 22.

The groove 48 on the button 26' has beveled edges which ride along the tapered end of the set screw 42'. As the set screw is further tightened, the set screw 42' rides along the beveled edge of groove 48 thus driving the threads 30' of the elongate aperture 28' into the threaded shaft of 22', thus locking the adjustable nut 10 with respect to the threaded shaft 22'.

Figure 5:
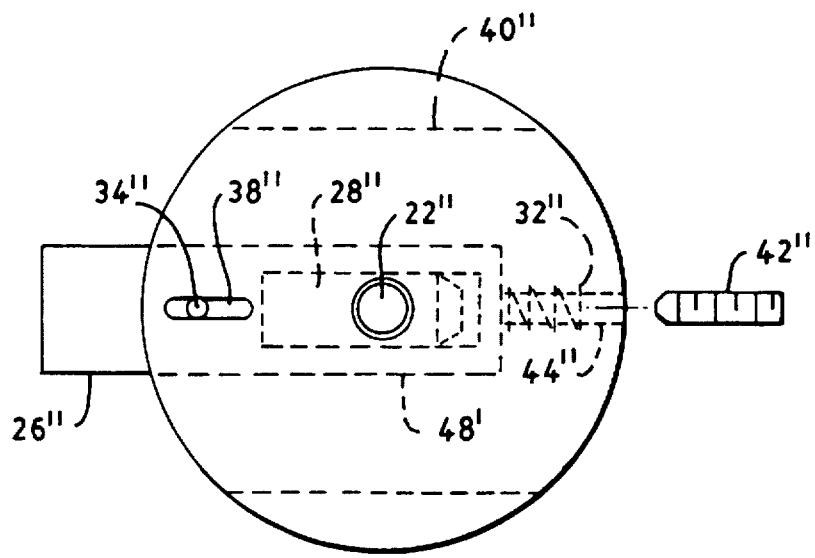
FIG. 5 shows a top cross-sectional view of the adjustable nut according to FIG. 1.

A third embodiment of adjustable nut 10" is depicted in FIG. 5 where like structures are marked with like numbers. In this embodiment, the set screw hole 44" is disposed substantially parallel to the button 26". The set screw 42" is then driven into the set screw hole 44" and passes along a center axis of the spring 32. The end of the set screw 42" then contacts a face of the button 26" at the distal end. Driving the set screw 42" inward increases inward force of the threads against the threaded shaft 22" thus securing a position of the nut 10" relative to the shaft 22" and inhibiting depression of the button 26".

Figure 6A:
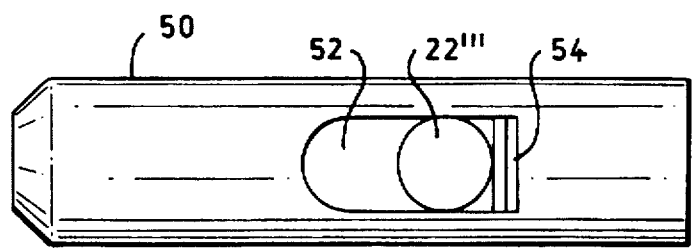
FIG. 6A is a top view of the an embodiment of the button in accordance with the invention.
Figure 6B:
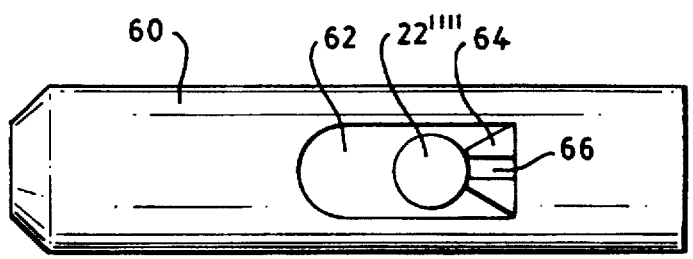
FIG. 6B is a top view of the another embodiment of the button in accordance with the invention.

Another embodiment of the invention uses the aforementioned body structure but replaces the button 26 with the buttons depicted in FIGS. 6A and 6B. FIG. 6A shows a button 50 having an elongate aperture 52 which is bullet-shaped. A first end of the elongate aperture 52 is oval as before. A second end of the elongate aperture 52 is substantially planar with threads 54 on a surface. The threaded bolt 22''' passes through the elongate aperture 52 and engages the threads 54 of the button 50 as previously described. The planar surface allows the threaded bolt 22''' to vary greatly in diameter thus accommodating many sizes of bolt without changing the width of the elongate aperture 52.

FIG. 6B is another embodiment of the button of FIG. 6A where the button 60 has an elongate aperture 62 for receiving the threaded shaft 22''''. In this embodiment though, the planar surface is broken into two threaded extensions 64, each having a substantially planar face with threads that mate with the threaded shaft 22''''. A space 66 is left between the two threaded extensions 64 allowing the threaded shaft to be cradles in the space 66 while engaging the threaded extensions 64. Cradling the threaded shaft inhibits lateral movement of the threaded shaft 22'''' when the threaded shaft 22'''' has a diameter substantially less than a width of the elongate aperture 62.

Figure 7A:
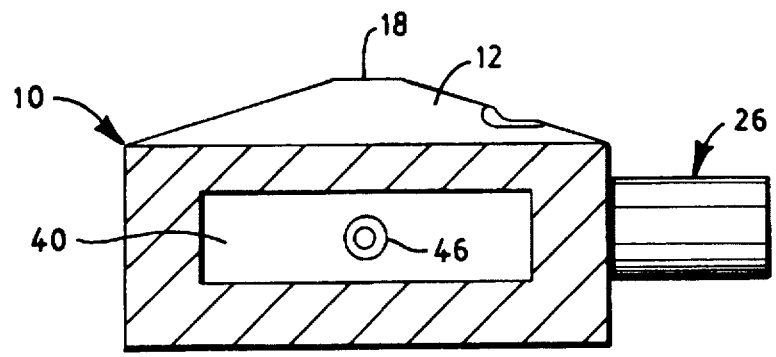
FIG. 7A shows the adjustable nut in accordance FIG. 1 detailing the bottom section.
Figure 7B:
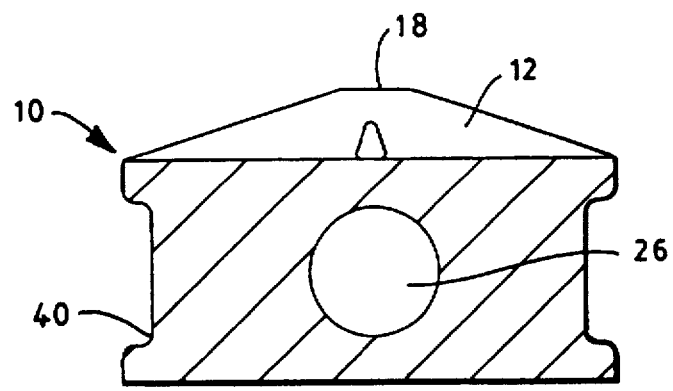
FIG. 7B shows a front cross-sectional of the adjustable nut in accordance with FIG. 1 detailing the bottom section.

Referring now to FIGS. 7A and 7B, wrench slots 40 are shown on opposing sides of the adjustable nut 10. Wrench slots provide a fine adjustability via a wrench, pliers or other such tool, allowing a user to tighten the adjustable nut 10 with a torque exceeding that readily provided with a user's hand alone.

To allow the user to tighten the adjustable nut 10, the wrench slots 40 are fabricated on lateral surfaces of the body 12 to receive a wrench (not shown) to augment rotational force on the adjustable nut 10. As such, the wrench slots 40 are substantially planer. The wrench engages the substantially planar surfaces, thus providing torque to the adjustable nut 10 upon use of the wrench.

In the preferred embodiment, the adjustable nut 10 has two wrench slots 40, although the embodiment may be practiced with more than one wrench slot, including for example four wrench slots or wrench slots that are a combination of more than one substantially planar surfaces that extend around the body of the adjustable nut.

An alternative embodiment of the invention preferred for use specifically with cymbals has a felt pad secured to a bottom surface of the nut. The felt pad is secured by an adhesive and ensures that the nut does not scratch an incident surface, the top of the cymbal for example.

The invention may be embodied in other specific forms without departing from the spirit or essential characteristics thereof The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An adjustable nut for use with a bolt having a threaded shaft, said adjustable nut comprising:

a body having a top surface, a bottom surface and a lateral surface integral with said top and bottom surfaces, said body having an axial passageway bored axially therethrough for permitting said threaded shaft to pass through the axial passageway, said body farther having a transverse bore extending radially from the lateral surface into the body such that the transverse bore intersects with said axial passageway;

a button disposed in said transverse bore having an elongate aperture passing radially therethrough which intersects with said axial passageway; said button having an operative position and an inoperative position, said operative position for mechanically interconnecting threads on said threaded shaft with mating threads disposed on a distal end of the elongate aperture, said inoperative position for disengaging the threads on the threaded shaft from the mating threads in the elongate aperture;

biasing means disposal in said transverse bore for urging the button into said operative position; and restrictive means for mechanically restricting a range of motion of the button thereby confining the button to the transverse bore, the restrictive means including a slot in the body and a pin extending radially outward from said button for mechanically restricting a range of motion of the button and through said slot in the bore and a set screw extending through the body and abutting a surface of said button whereby said mating threads in the elongate aperture of the button can be forced into engagement with a threaded shaft.

2. The adjustable nut according to claim 1 wherein said distal end of said elongate aperture in the button is substantially planar having a plurality of threads extending substantially across the distal end for accommodating engagement with threaded shafts of various diameter.

3. The adjustable nut according to claim 1 wherein said distal end of said elongate aperture in the button has a plurality of extensions protruding therefrom with substantially threaded planar surfaces for allowing the threads on the threaded shaft to interconnect the mating threads on the adjustable nut, said plurality of extensions being separated by space for cradling the threaded shaft to inhibit lateral movement of the threaded shaft within the elongate aperture when the button is in the operative position.

4. An adjustable fastening system for use with a threaded shaft, said fastening system comprising:

a body having a top surface, a bottom surface and a lateral surface integral with said top and bottom surfaces, said body having an axial passage ay bored axially therethrough adapted to receive the threaded shaft and having a transverse bore extending radially through the lateral surface into the body such that the transverse bore intersects with said axial passageway;

a button disposed in said transverse bore having an elongate aperture passing radially therethrough which intersects with said axial passageway whereby said threaded shaft can pass through the elongate aperture, said button having an operative position and an inoperative position, said operative position for mechanically interconnecting a plurality of mating threads disposed across a substantially planar distal end of the elongate aperture with threads on said threaded shaft, said inoperative position for moving the mating threads in the elongate aperture away from said threads on said threaded shaft to provide mechanical isolation with respect to the threaded shaft;

fixing means having an obstructive position for restricting motion of the button and a nonobstructive position for permitting freedom of motion to the button; and biasing means disposed in said transverse bore for urging the button into said operative position.

\* \* \* \* \*